United States Patent
Karlsson et al.

(10) Patent No.: US 9,621,052 B2
(45) Date of Patent: Apr. 11, 2017

(54) SWITCHED MODE POWER SUPPLY AND METHOD OF OPERATING A SWITCHED MODE POWER SUPPLY

(71) Applicant: Telefonaktiebolaget L M Ericsson (publ), Stockholm (SE)

(72) Inventors: Magnus Karlsson, Oskarshamn (SE); Oscar Persson, Kalmar (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 69 days.

(21) Appl. No.: 14/430,933

(22) PCT Filed: May 15, 2014

(86) PCT No.: PCT/SE2014/050592
§ 371 (c)(1),
(2) Date: Mar. 25, 2015

(87) PCT Pub. No.: WO2015/174899
PCT Pub. Date: Nov. 19, 2015

(65) Prior Publication Data
US 2016/0261192 A1    Sep. 8, 2016

(51) Int. Cl.
*H02M 3/335* (2006.01)
*H02M 1/08* (2006.01)

(52) U.S. Cl.
CPC ......... *H02M 3/33507* (2013.01); *H02M 1/08* (2013.01); *H02M 3/33523* (2013.01)

(58) Field of Classification Search
CPC ......... H02M 3/33507; H02M 3/33523; H02M 3/33561; H02M 3/33569;
(Continued)

(56) References Cited

U.S. PATENT DOCUMENTS 6,239,993 B1 * 5/2001 Fraidlin ............ H02M 3/33569
363/132
6,288,913 B1 * 9/2001 White ................. H02M 3/3372
363/133
(Continued)

FOREIGN PATENT DOCUMENTS

DE     102008009859 A1   8/2009
WO     2009105734 A2     8/2009
WO     2010143048 A1    12/2010

*Primary Examiner* — Yemane Mehari
(74) *Attorney, Agent, or Firm* — Coats & Bennett, PLLC (57) ABSTRACT

A switched mode power supply comprises a switched mode converter (12) and a controller for controlling the switched mode converter, wherein the switched mode converter is provided for converting an input voltage ($V_{in}$) to an output voltage ($V_{out}$) and includes, on a primary side, a primary winding ($X_1$) and a controllable switch based circuitry (31) connecting the input voltage over the primary winding; and, on a secondary side, a secondary winding ($X_2$) coupled to the primary winding, and a capacitive element (C) connected over the secondary winding, wherein the output voltage is obtained as the voltage over the capacitive element. The primary winding comprises a first winding portion ($n_{p1}$) and at least one further winding portion ($n_{p2}$); and the switch based circuitry comprises controllable switches ($Q_{11}$, $Q_{41}$, $Q_{12}$, $Q_{42}$, $Q_{21}$, $Q_{31}$) capable of switching between a first operation state wherein the input voltage is connected only over the first winding portion and at least a second operation state wherein the input voltage is connected over the first and the at least one further winding portions, thereby enabling switching between two different transformer ratios ($n_1$, $n_2$).

21 Claims, 6 Drawing Sheets

(58) Field of Classification Search
CPC . H02M 2001/0032; H02M 2001/0035; H02M 2001/0038; H02M 2001/0041; H02M 2001/0042
USPC .......................................... 363/21.01–21.18
See application file for complete search history.

(56) References Cited

U.S. PATENT DOCUMENTS

| | | | |
|---|---|---|---|
| 6,320,764 | B1 | 11/2001 | Jiang et al. |
| 7,787,261 | B2 | 8/2010 | Farrington et al. |
| 8,106,636 | B2 * | 1/2012 | Asinovski ............... H02M 1/10 323/258 |
| 8,279,632 | B2 | 10/2012 | Wohrle |
| 2005/0243580 | A1 * | 11/2005 | Lyle ................. H02M 7/53806 363/16 |
| 2013/0279208 | A1 | 10/2013 | Lai et al. |

* cited by examiner

SWITCHED MODE POWER SUPPLY AND METHOD OF OPERATING A SWITCHED MODE POWER SUPPLY

TECHNICAL FIELD

The technical field relates generally to switched mode power supplies (SMPS:es) and methods of operating switched mode power supplies.

BACKGROUND

Using a fixed ratio converter intermediate bus converter (IBC) with constant duty cycle causes the output voltage to vary in a large range depending of the input voltage range. This puts restrictions on the input voltage range in order to avoid overvoltage for downstream point of load converters supplied by the IBC. By controlling and switching the transformer ratio, the output voltage range can be decreased.

In most SMPS topologies, the output voltage is directly proportional to the input voltage $V_O \propto nDV_1$, where D is the duty cycle, and n is the transformer ratio if a transformer is used in the SMPS.

Fixed ratio converters or intermediate bus converters, also referred to as unregulated converters, which lack control of the output voltage, run with a fixed maximized duty cycle. This yields maximized power efficiency since the converter transfer energy almost 100% of the time, with the exception of the dead time needed during switching. With this strategy the output voltage varies with the input voltage according to the above equation. The narrow regulation of the voltage is taken care of by a second layer SMPS referred to as point of load regulators: This power architecture is referred to as intermediate bus architecture, see U.S. Pat. No. 7,787,261 B1.

Semi-regulated converters compensate for the varying input voltage (line regulation) at the expense of a varying duty cycle which reduces the power efficiency. The load affects the output voltage and the output voltage decreases with increasing load, also known as drop. Since the output of a SMPS has an LC filter, load transients cause the output voltage to oscillate, where only the inherent parasitic resistances dampen the oscillations.

Quasi-regulated bus converters, which are described in the above cited U.S. Pat. No. 7,787,261 B1, are line regulated in only one portion of the input voltage range, whereas in other portions of the input voltage range, the converters are unregulated using 100% duty cycle. This yields an increased input voltage range without increasing the output voltage range.

Output regulated converters compensate for varying load conditions and input voltage changes by feedback of the output voltage. Voltage feed forward control is often employed in order to reduce output voltage disturbances due to input voltage transients. This type of regulation offers the most stable output voltage at the cost of lower efficiency.

SUMMARY

The control strategies described in the background have drawbacks in terms of output voltage tolerances, transient responses, and power efficiency. Since many of these properties are dependent upon one another, the optimizing of one causes others to be worse.

It is an aim to provide a converter for a switched mode power supply, by which the above drawbacks can be alleviated, or at least mitigated.

A first aspect refers to a switched mode power supply comprising a switched mode converter and a controller for controlling the switched mode converter, wherein the switched mode converter is provided for converting an input voltage to an output voltage and includes, on a primary side, a primary winding and a controllable switch based circuitry connecting the input voltage over the primary winding; and, on a secondary side, a secondary winding coupled to the primary winding, and a capacitive element connected over the secondary winding, wherein the output voltage is obtained as the voltage over the capacitive element. The primary winding comprises a first winding portion and at least one further winding portion; and the switch based circuitry comprises controllable switches capable of switching between a first operation state wherein the input voltage is connected only over the first winding portion and at least a second operation state wherein the input voltage is connected over the first and the at least one further winding portions, thereby enabling switching between two different transformer ratios.

The controller may be operatively connected to monitor the input voltage and may be configured to control the controllable switches to switch between the first and the at least second operation states in response to the monitored input voltage. Hereby, the output voltage variation can be reduced.

In one embodiment, the controller may be configured to control the controllable switches to switch from the second operation state to the first operation state when the monitored input voltage increases above a first threshold voltage and to switch from the first operation state back to the second operation state when the monitored input voltage decreases below a second threshold voltage, where the first threshold voltage may be higher than the second threshold value to obtain hysteresis and avoid frequent switching between the operation states at an input voltage which varies around a single threshold voltage.

In another embodiment, the controllable switches may, in each of the first and second operation states, be capable of switching between a connected state wherein the primary winding may be connected to the input voltage and a disconnected state wherein the input voltage may be disconnected from the primary winding, thereby enabling the duty cycle of the switched mode converter to be altered. The controller may be configured, when the monitored input voltage increases above a first threshold voltage, to control the controllable switches to switch to alter the duty cycle from a nominal duty cycle to a lower duty cycle during a time period, while staying in the second operation state, and, at the end of the time period, to control the controllable switches to switch to simultaneously alter the duty cycle back to the nominal duty cycle and change the operation state from the second operation state to the first operation state.

Further, the controller may be configured, when the monitored input voltage decreases below a second threshold voltage, to control the controllable switches to switch to simultaneously alter the duty cycle from the nominal duty cycle to the lower duty cycle and change the operation state from the first operation state back to the second operation state, and thereafter to control the controllable switches to switch to alter the duty cycle back to the nominal duty cycle during the time period.

Again, the first threshold voltage may be higher than the second threshold value to obtain hysteresis.

The time period may be between about 0.1 and 10 ms, preferably between about 0.2 and 5 ms, more preferably between about 0.5 and 2 ms, and most preferably about 1 ms.

The lower duty cycle times the transformer ratio of the second operation state may, at least approximately, be equal to the nominal duty cycle times the transformer ratio of the first operation state.

The above control scheme is provided for maintaining highest possible power efficiency and minimizing output choke current ripple, while the output voltage variation is reduced.

By controlling the number of active primary winding turns the transformer ratio can be changed on the fly.

The controllable switch based circuitry on the primary side may be any of a full bridge, half bridge, or push-pull based circuitry. The secondary side circuitry may be any of a single winding or double center-tapped winding based circuitry. The converter may be provided with synchronous and non-synchronous rectification circuitry.

In one embodiment, the controllable switches may comprise six switches in three legs with two switches in each of the three legs, wherein each of the legs may be connected in parallel with the input voltage, and a point between the switches of a first one of the legs may be connected to one end of the primary winding, a point between the switches of a second one of the legs may be connected to the opposite end of the primary winding, and a point between the switches of a third one of the legs may be connected to a point the primary winding separating the first winding portion and the at least one further winding portion.

In another embodiment, the primary winding may comprise a first winding portion, a second winding portion, and a third winding portion, wherein the switch based circuitry may comprise controllable switches capable of switching between a first operation state wherein the input voltage is connected only over the first winding portion, a second operation state wherein the input voltage is connected only over the first and second winding portions, and a third operation state wherein the input voltage is connected over the first, second, and third winding portions, thereby enabling switching between three different transformer ratios.

The controllable switches may comprise eight switches in four legs with two switches in each of the four legs, wherein each of the legs may be connected in parallel with the input voltage, and a point between the switches of a first one of the legs may be connected to one end of the primary winding, a point between the switches of a second one of the legs may be connected to the opposite end of the primary winding, a point between the switches of a third one of the legs may be connected to a point of the primary winding separating the first and second winding portions, and a point between the switches of a fourth one of the legs may be connected to a point of the primary winding separating the second and third winding portions.

If the controller is configured to control the controllable switches to switch between a connected state wherein the primary winding is connected to the input voltage and a disconnected state wherein the input voltage is disconnected from the primary winding, the controller may be configured to control the controllable switches to switch such that the current direction through the primary winding is altered every time the primary winding is connected to the input voltage.

The switched mode converter may be a DC-DC converter, e.g. a DC-DC voltage down-converter, e.g. configured to operate with input and output voltages in the range of 10-100 V.

A second aspect refers to a base station comprising the switched mode power supply of the first aspect.

A third aspect refers to a method of operating a switched mode converter of the first aspect. According to the method the input voltage is monitored and the controllable switches are switched between the first and the at least second operation states in response to the monitored input voltage. The method of the third aspect may comprise switching the switches in accordance with any of the control schemes, methods, and steps as disclosed above with reference to the first aspect.

Further characteristics and advantages will be evident from the detailed description of embodiments given hereinafter, and the accompanying FIGS. 1-12, which are given by way of illustration only.

DETAILED DESCRIPTION

Figure 1:
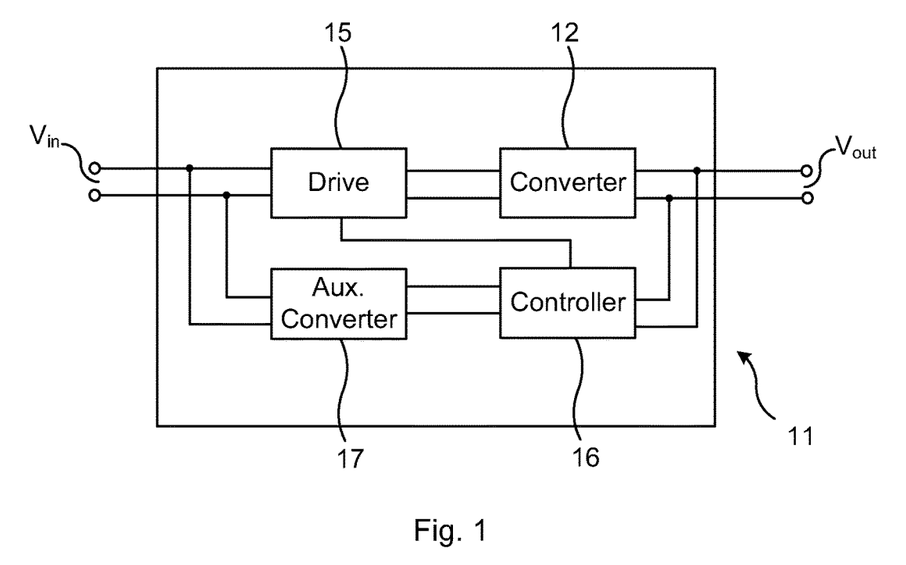
FIG. 1 illustrates, schematically, in a Nock diagram an embodiment of a switched mode power supply.

FIG. 1 illustrates, schematically, an embodiment of a switched mode power supply 11 comprising a switched mode converter 12 for converting an input voltage $V_{in}$ to an output voltage $V_{out}$, a drive 15 for driving the converter 12, a controller 16 for controlling the drive 15 and thus the operation of the converter 12, and a housekeeping or auxiliary converter 17 for down converting the input voltage $V_{in}$ to a voltage suitable for the controller 16, such that the controller 16 can be powered by the input voltage $V_{in}$.

The converter 12 may be an isolated DC-DC converter, typically down-converting the input voltage $V_{in}$ to a suitable output power $V_{out}$. The converter 12 may typically operate with input $V_{in}$ and output $V_{out}$ voltages in the range of 10-100 V.

Figure 2:
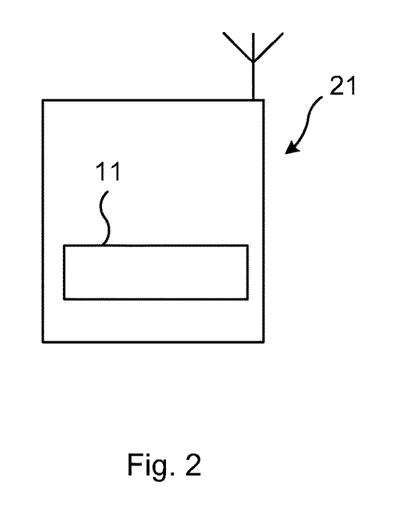
FIG. 2 illustrates, schematically, an embodiment of a base station comprising one or more of the switched mode power supply of FIG. 1.

FIG. 2 illustrates, schematically, an embodiment of a base station 21 comprising one or more of the switched mode power supply 11 of FIG. 1.

Figure 3:
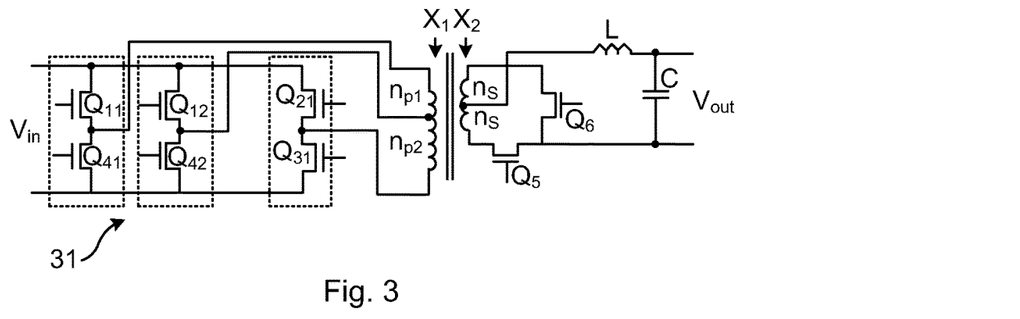
FIG. 3 illustrates, schematically, in a circuit diagram, an embodiment of a converter, which can be used in the switched mode power supply of FIG. 1.

FIG. 3 illustrates, schematically, in a circuit diagram, an embodiment of a converter, which can be used in the switched mode power supply of FIG. 1, wherein a switched primary windings transformer is driven by an extended full-bridge switch circuitry.

The converter comprises, on a primary side, a primary winding $X_1$ and a controllable switch based circuitry 31 connecting the input voltage $V_{in}$ over the primary winding $X_1$. The primary winding $X_1$ comprises a first winding portion or number of winding turns $n_{p1}$ and a second winding portion or number of winding turns $n_{p2}$. The switch based circuitry 31 comprises controllable switches $Q_{11}$, $Q_{41}$, $Q_{12}$, $Q_{42}$, $Q_{21}$, $Q_{31}$ capable of switching between a first operation state wherein the input voltage $V_{in}$ is connected only over the first winding portion $n_{p1}$ and a second operation state wherein the input voltage is connected over the first $n_{p1}$ and second $n_{p2}$ winding portions, thereby enabling switching between two different transformer ratios $n_1$, $n_2$ given by:

$$\begin{cases} n_1 = \dfrac{n_s}{n_{p1}+n_{p2}} \text{ with } Q11, Q41 \\ n_2 = \dfrac{n_s}{n_{p1}} \text{ with } Q12, Q42 \end{cases}$$

where $n_s$ is the number of winding turns on the secondary side.

The switches $Q_{11}$, $Q_{41}$, $Q_{12}$, $Q_{42}$, $Q_{21}$, $Q_{31}$ are arranged in three legs with two switches in each of the three legs, wherein each of the legs is connected in parallel with the input voltage $V_{in}$, and a point between the switches $Q_{11}$, $Q_{41}$ of a first one of the legs is connected to one end of the primary winding $X_1$, a point between the switches $Q_{21}$, $Q_{31}$ of a second one of the legs is connected to the opposite end of the primary winding $X_1$, and a point between the switches $Q_{12}$, $Q_{42}$ of a third one of the legs is connected to a point the primary winding $X_1$ separating the first $n_{p1}$ and second $n_{p1}$ winding portions.

The converter comprises, on a secondary side, a secondary winding $X_2$ coupled to the primary winding $X_1$, an inductive element L connected to one end of the secondary winding $X_2$ and a capacitive element C connected over the secondary winding $X_2$, wherein the output voltage is obtained as the voltage over the capacitive element C. The secondary winding $X_2$ may be a double winding having $n_s$ number of winding turns in each winding and switches $Q_5$ and $Q_6$ are provided for secondary side switching in a customary manner.

The controller 16 of the switched mode power supply 11 is operatively connected to monitor the input voltage $V_{in}$ and is configured to control the controllable switches $Q_{11}$, $Q_{41}$, $Q_{12}$, $Q_{42}$, $Q_{21}$, $Q_{31}$ to switch between the first and the second operation states in response to the monitored input voltage $V_{in}$ to thereby reduce the output voltage variation.

The controller 16 may be configured to control the controllable switches $Q_{11}$, $Q_{41}$, $Q_{12}$, $Q_{42}$, $Q_{21}$, $Q_{31}$ to switch between a connected state wherein the primary winding $X_1$ is connected to the input voltage $V_{in}$ and a disconnected state wherein the input voltage $V_{in}$ is disconnected from the primary winding $X_1$ to thereby obtain a suitable duty cycle.

Figure 4:
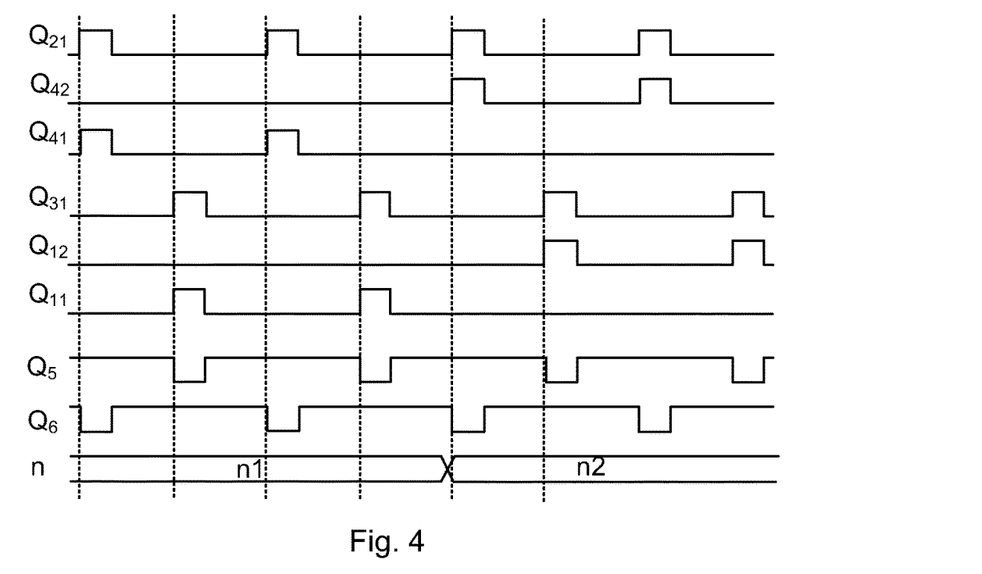
FIG. 4 illustrates, schematically, in a diagram, a switching pattern for the converter of FIG. 3.

FIG. 4 illustrates, schematically, in a timing diagram, a switching pattern for the converter of FIG. 3. The gate signals to the respective switches $Q_{21}$, $Q_{42}$, $Q_{41}$, $Q_{31}$, $Q_{12}$, $Q_{11}$, $Q_5$, and $Q_6$ as well as the active transformer ratio n are illustrated.

Firstly, the leg with switches $Q_{41}$ and $Q_{11}$ is active yielding the transformer ratio $n_1$ in the first operation state, and thereafter the kg with switches $Q_{42}$ and $Q_{12}$ is active yielding the transformer ratio $n_2$ in the second operation state. It shall be noted that the switches $Q_{41}$ and $Q_{11}$ in the first operation state and the switches $Q_{42}$ and $Q_{12}$ in the second operation state are synchronized with the switches $Q_{21}$ and $Q_{31}$ such that the current direction through the primary winding $X_1$ is alternating in each of the first and second operation states. The switches $Q_5$ and $Q_6$ on the secondary side are switched as indicated in a customary manner.

The switching requires an extra set of drivers for driving the switches $Q_{21}$, $Q_{42}$, $Q_{41}$, $Q_{31}$, $Q_{12}$, $Q_{11}$, and a control circuit for selecting the transformer ratio n as compared to a fixed transformer ratio operation using full bridge switching.

Figure 5:
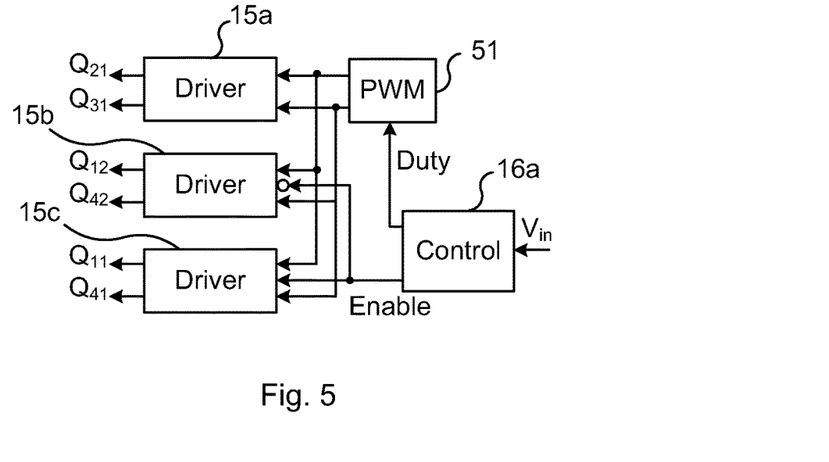
FIG. 5 illustrates, schematically, in a Nock diagram an embodiment of a driver and control circuit arrangement for the converter of FIG. 3.

FIG. 5 illustrates, schematically, in a Nock diagram an embodiment of a driver and control circuit arrangement for the converter of FIG. 3 comprising a driver 15a-c for the respective leg of the converter 12, a control circuit 16a for selecting transformer ratio n, and a pulse width modulator (PWM) 51. The drivers 15a-c may be comprised in the drive 15 of the switched mode power supply 11 of FIG. 1 and the control circuit 16a and the pulse width modulator 51 may be comprised in the controller 16 of the switched mode power supply 11 of FIG. 1. The control circuit 16a is configured to select the transformer ratio n depending on the monitored input voltage $V_{in}$ and enables the kg $Q_{12}$, $Q_{42}$ or the leg $Q_{11}$, $Q_{41}$ to be switched.

Figure 6:
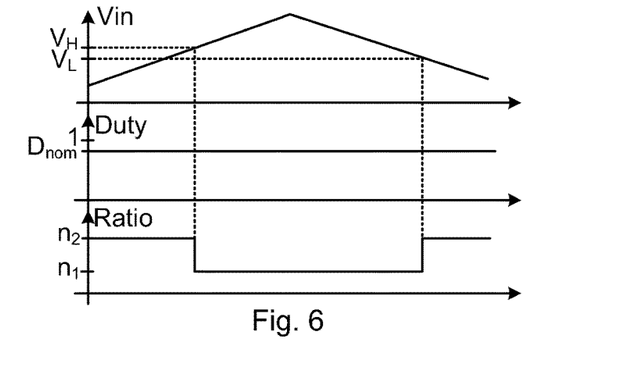
FIG. 6 illustrates, schematically, in a diagram, a control scheme for the driver and control circuit arrangement of the FIG. 5.
Figure 7A:
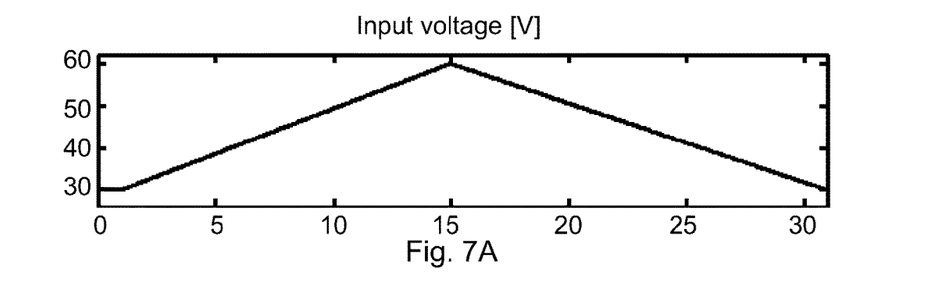
FIGS. 7a-d illustrate, schematically, in respective diagrams, the input voltage, the transformer ratio, the output voltage and the choke current of the converter of FIG. 3 during a simulated operation using the control scheme illustrated in FIG. 6.
Figure 7B:
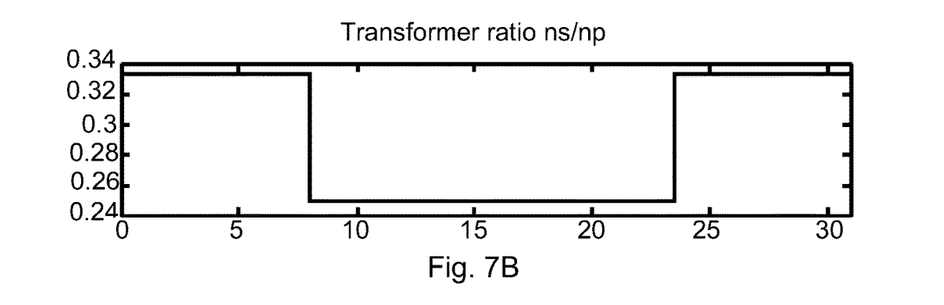
Figure 7C:
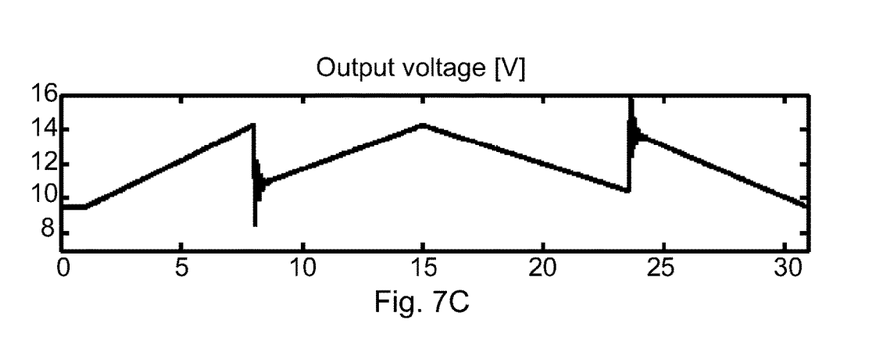
Figure 7D:
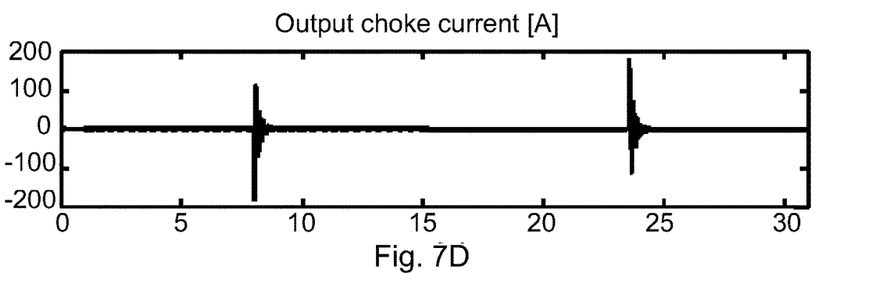

FIG. 6 illustrates, schematically, in a diagram, a control scheme for the driver and control circuit arrangement of the FIG. 5.

The controller 16 is configured to control the controllable switches $Q_{11}$, $Q_{41}$, $Q_{12}$, $Q_{41}$, $Q_{12}$, $Q_{42}$, $Q_{21}$, $Q_{31}$ to switch from the second operation state to the first operation state when the monitored input voltage $V_{in}$ increases above a first threshold voltage $V_H$ and to switch from the first operation state back to the second operation state when the monitored input voltage decreases below a second threshold voltage $V_L$. The first threshold voltage $V_H$ is preferably higher than the second threshold value $V_L$ to obtain hysteresis. The duty cycle may be maximized at all times and equal to a nominal duty cycle $D_{nom}=97\%$.

FIGS. 7a-d illustrate, schematically, in respective diagrams, the input voltage, the transformer ratio, the output voltage and the choke current of the converter of FIG. 3 during a simulated operation using the control scheme illustrated in FIG. 6.

The simulation was made of a converter with three and four primary winding turns and one secondary winding turn, i.e. the transformer ratios 3:1 and 4:1 respectively. The input voltage was swept in the range [30, 60] V, the first threshold voltage $V_H$ was set to 45 V, the second threshold value $V_L$ was set to 44V, and the duty cycle was set to $D_{nom}$=95%. The output choke was 400 nH and the total capacitance was 1.5 mF, which in many applications is a small capacitance. The simulation shows that the quick change of transformer ratio causes a ringing in the output filter, shown in both the output voltage and the choke current. It can also be noted that the output voltage range has decreased from [7.125, 14.25] V using a constant 4:1 ratio to the range [9.5, 14.25] V with switched ratio 3:1 or 4:1.

Figure 8:
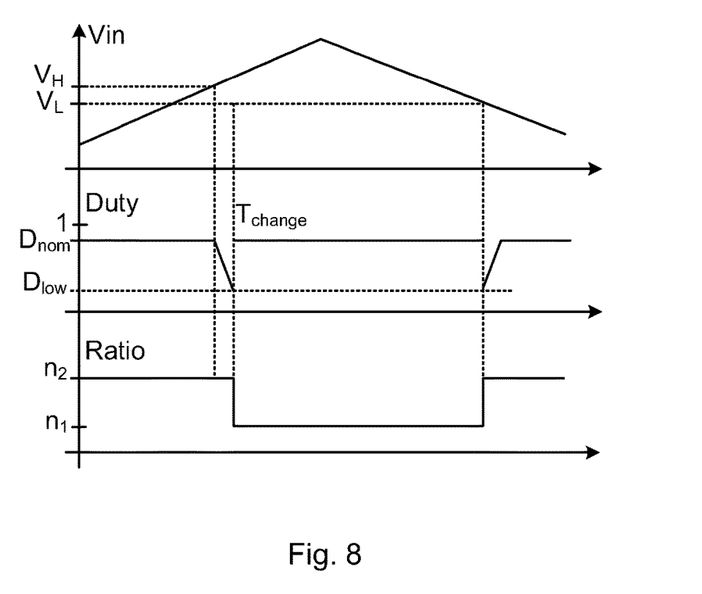
FIG. 8 illustrates, schematically, in a diagram, an alternative control scheme for the driver and control circuit arrangement of the FIG. 5.
Figure 9A:
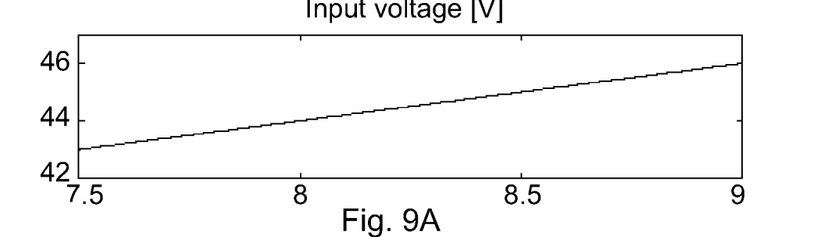
FIGS. 9a-e illustrate, schematically, in respective diagrams, the input voltage, the transformer ratio, the output voltage, the choke current, and the duty cycle of the converter of FIG. 3 during a simulated operation using the control scheme illustrated in FIG. 8.
Figure 9B:
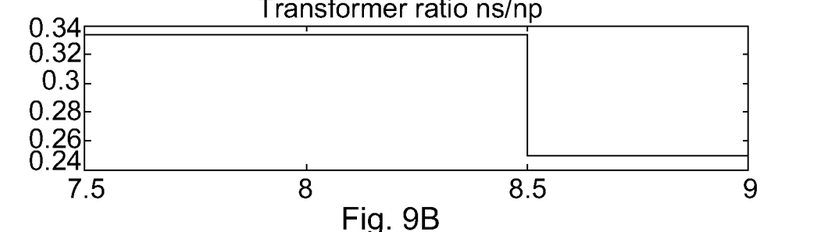
Figure 9C:
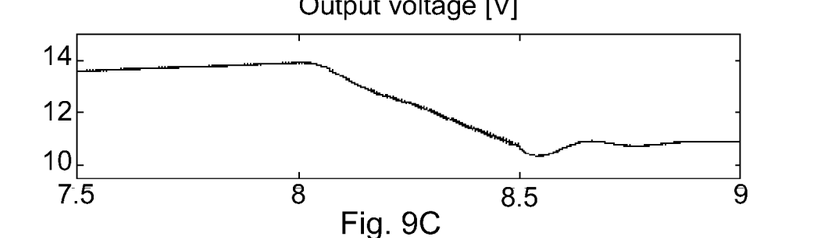
Figure 9D:
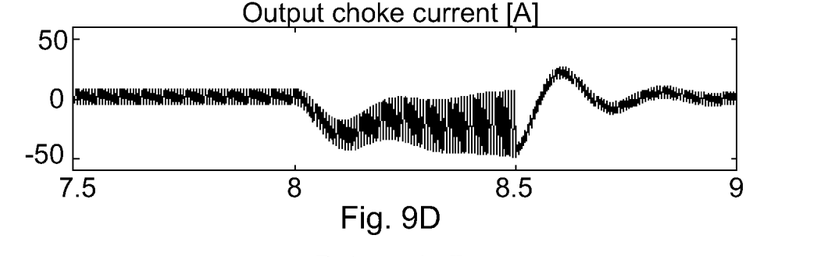
Figure 9E:
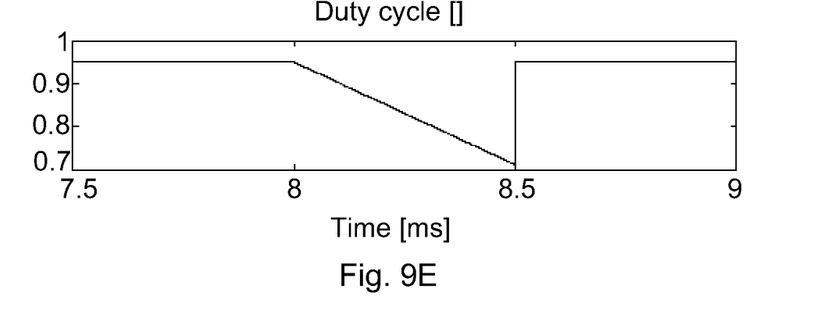

The ringing can be reduced with a smooth change of transformer ratio. To this end, FIG. 8 illustrates, schematically, in a diagram, an alternative control scheme for the driver and control circuit arrangement of the FIG. 5.

The controller 16 is configured, when the monitored input voltage $V_{in}$ increases above the first threshold voltage $V_H$, to control the controllable switches $Q_{11}$, $Q_{41}$, $Q_{12}$, $Q_{42}$, $Q_{21}$, $Q_{31}$ to switch to alter the duty cycle from a nominal duty cycle $D_{nom}$ to a lower duty cycle Mow during a time period $T_{change}$, while staying in the second operation state, and, at the end of the time period $T_{change}$, to control the controllable switches $Q_{11}$, $Q_{41}$, $Q_{12}$, $Q_{42}$, $Q_{21}$, $Q_{31}$ to switch to simultaneously alter the duty cycle back to the nominal duty cycle $D_{nom}$ and change the operation state from the second operation state to the first operation state.

The procedure in the opposite direction, when the input voltage decreases towards the second threshold voltage $V_L$, is mirrored.

The controller 16 is thus configured, when the monitored input voltage decreases below the second threshold voltage $V_L$, to control the controllable switches $Q_{11}$, $Q_{41}$, $Q_{12}$, $Q_{42}$, $Q_{21}$, $Q_{31}$ to switch to simultaneously alter the duty cycle from the nominal duty cycle $D_{nom}$ to the lower duty cycle $D_{low}$ and change the operation state from the first operation state back to the second operation state, and thereafter to control the controllable switches $Q_{11}$, $Q_{41}$, $Q_{12}$, $Q_{42}$, $Q_{21}$, $Q_{31}$ to switch to alter the duty cycle back to the nominal duty cycle $D_{nom}$ during the time period $T_{change}$.

The time period $T_{change}$ may be between about 0.1 and 10 ms, preferably between about 0.2 and 5 ms, more preferably between about 0.5 and 2 ms, and most preferably about 1 ms, whereas the change in duty cycle made simultaneously as the operation state is changed, is instantaneous.

To obtain the smooth change of transformer ratio, the lower duty cycle $D_{low}$ times the transformer ratio $n_2$ of the second operation state should, at least approximately, be equal to the nominal duty cycle $D_{nom}$ times the transformer ratio $n_1$ of the first operation state:

$$D_{low} = \frac{n_1}{n_2} D_{nom}.$$

FIGS. 9a-e illustrate, schematically, in respective diagrams, the input voltage, the transformer ratio, the output voltage, the choke current, and the duty cycle of the converter of FIG. 3 during a simulated operation using the control scheme illustrated in FIG. 8. The simulation used the same parameters as those disclosed above with the addition that the time period $T_{change}$ was set to 0.5 ms.

It can be observed that the output voltage ringing has almost been eliminated, and the current ringing is reduced from almost 200 A down to 50 A peak value. It can also be noted that the current ripple increases when the duty cycle is decreased.

It shall be appreciated that the concept of switching in and out primary winding portions in response to the input voltage in order to obtain a more stable output voltage can be extended to any number of primary winding portions and thus operation states with different transformer ratios.

Figure 10:
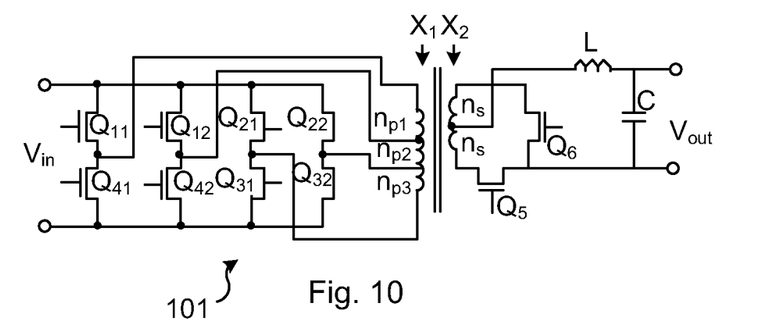
FIG. 10 illustrates, schematically, in a circuit diagram, an alternative embodiment of a converter, which can be used in the switched mode power supply of FIG. 1.

FIG. 10 illustrates, schematically, in a circuit diagram, an alternative embodiment of a converter, which can be used in the switched mode power supply of FIG. 1.

The primary winding $X_1$ comprises a first winding portion $n_{p1}$, a second winding portion $n_{p2}$, and a third winding portion $n_{p3}$, and the switch based circuitry 101 comprises controllable switches $Q_{11}$, $Q_{41}$, $Q_{12}$, $Q_{42}$, $Q_{21}$, $Q_{31}$, $Q_{22}$, $Q_{32}$ capable of switching between a first operation state wherein the input voltage $V_{in}$ is connected only over the first winding portion $n_{p1}$, a second operation state wherein the input voltage $V_{in}$ is connected only over the first $n_{p1}$ and second $n_{p2}$ winding portions, and a third operation state wherein the input voltage $V_{in}$ is connected over the first $n_{p1}$, second $n_{p2}$, and third $n_{p3}$ winding portions, thereby enabling switching between three different transformer ratios.

The controllable switches $Q_{11}$, $Q_{41}$, $Q_{12}$, $Q_{42}$, $Q_{21}$, $Q_{31}$, $Q_{22}$, $Q_{32}$ are arranged in four legs with two switches in each of the four legs, wherein each of the legs is connected in parallel with the input voltage $V_{in}$, and a point between the switches $Q_{11}$, $Q_{41}$ of a first one of the legs is connected to one end of the primary winding $X_1$, a point between the switches $Q_{21}$, $Q_{31}$ of a second one of the legs is connected to the opposite end of the primary winding $X_1$, a point between the switches $Q_{12}$, $Q_{42}$ of a third one of the legs is connected to a point of the primary winding $X_1$ separating the first $n_{p1}$ and second $n_{p2}$ winding portions, and a point between the switches $Q_{22}$, $Q_{32}$ of a fourth one of the legs is connected to a point of the primary winding $X_1$ separating the second $n_{p2}$ and third $n_{p3}$ winding portions.

It shall further be appreciated that the concept of switching in and out primary winding portions in response to the input voltage can be applied to a great variety of SMPS topologies beside the full-bridge center-tapped secondary side transformer with synchronous rectification as disclosed above. Such topologies include, but are not limited to, half bridge and push-pull based circuitry on the primary side, and single winding and diode rectification circuitry on the secondary side. The concept can be used in any combination of primary side circuit, secondary side circuit, and type of rectification.

Figure 11:
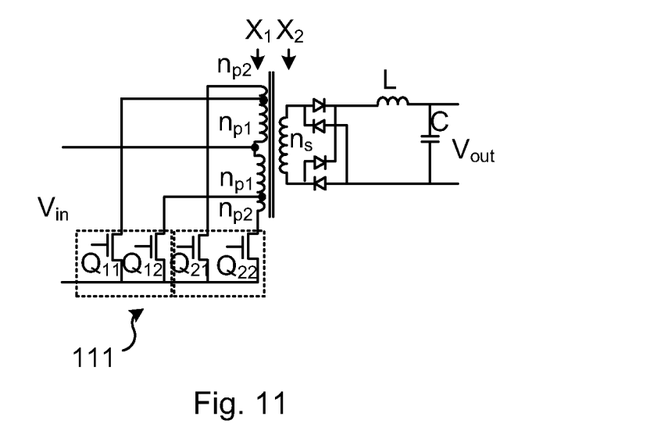
FIG. 11 illustrates, schematically, in a circuit diagram, a further alternative embodiment of a converter, which can be used in the switched mode power supply of FIG. 1.

FIG. 11 illustrates, schematically, in a circuit diagram, an example embodiment of a converter, which can be used in the switched mode power supply of FIG. 1, and which is based on a push-pull based circuitry 111 on the primary side and a single winding secondary side circuitry with full-wave diode rectification.

The control of the SMPS employing the can be implemented using either analog or digital electronics. The controller can be arranged on the primary or the secondary side of the converter, with preference to the primary side.

Figure 12:
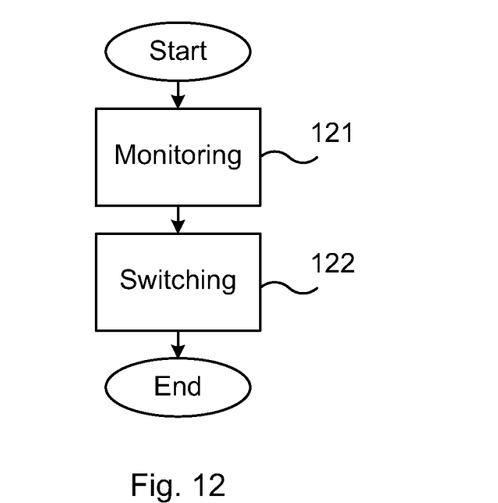
FIG. 12 is a schematic flow scheme of an embodiment of a method of operating a converter such as e.g. the converter of FIG. 3.

FIG. 12 is a schematic flow scheme of an embodiment a method of operating a converter such as e.g. the converter of FIG. 3. According to the method, the input voltage is, in a step 121, monitored and the controllable switches are, in a step 122, switched between the first and the second operation states in response to the monitored input voltage.

The embodiment of FIG. 12 may be modified to comprise switching of the switches in accordance with any of the control schemes, methods, and/or steps as disclosed above with reference to FIGS. 6 and 8.

It shall be appreciated by a person skilled in the art that the embodiments disclosed herein are merely example embodiments, and that any details and measures are purely given as examples.

The invention claimed is:

1. A switched mode power supply, comprising:
a switched mode converter configured to convert an input voltage to an output voltage;
a controller for controlling the switched mode converter;
wherein the switched mode converter comprises:
on a primary side, a primary winding and a controllable switch based circuitry connecting the input voltage over the primary winding;
on a secondary side, a secondary winding coupled to the primary winding; and
a capacitive element connected over the secondary winding;
wherein the output voltage is obtained as the voltage over the capacitive element;
wherein the primary winding comprises a first winding portion and at least one further winding portion;
wherein the switch based circuitry comprises controllable switches capable of switching between a first operation state wherein the input voltage is connected only over the first winding portion and at least a second operation state wherein the input voltage is connected over the first and the at least one further winding portions, thereby enabling switching between two different transformer ratios; and
wherein the controller is operatively connected to the controllable switches and configured to:
monitor the input voltage; and
control the controllable switches to switch between the first and the at least second operation states based on the monitored input voltage, with different threshold voltages used to switch the switches from the first operation state to the second operation state and to switch back.

2. The switched mode power supply of claim 1, wherein the controller is configured to control the controllable switches to:
switch from the second operation state to the first operation state when the monitored input voltage increases above a first threshold voltage; and
switch from the first operation state back to the second operation state when the monitored input voltage decreases below a second threshold voltage.

3. The switched mode power supply of claim 2, wherein the first threshold voltage is higher than the second threshold value.

4. The switched mode power supply of claim 1:
wherein the controllable switches, in each of the first and second operation states, are capable of switching between a connected state wherein the primary winding is connected to the input voltage and a disconnected state wherein the input voltage is disconnected from the primary winding, thereby enabling the duty cycle of the switched mode converter to be altered; and
wherein the controller is configured to:
when the monitored input voltage increases above the first threshold voltage, control the controllable switches to switch to alter the duty cycle from a nominal duty cycle to a lower duty cycle during a time period, while staying in the second operation state; and
at the end of the time period, to control the controllable switches to switch to simultaneously alter the duty cycle back to the nominal duty cycle and change the operation state from the second operation state to the first operation state.

5. The switched mode power supply of claim 4, wherein the controller is configured to:
when the monitored input voltage decreases below the second threshold voltage, to control the controllable switches to switch to simultaneously alter the duty cycle from the nominal duty cycle to the lower duty cycle and change the operation state from the first operation state back to the second operation state; and
thereafter, to control the controllable switches to switch to alter the duty cycle back to the nominal duty cycle during the time period.

6. The switched mode power supply of claim 4, wherein the time period is between about 0.1 and 10 milliseconds.

7. The switched mode power supply of claim 4, wherein the lower duty cycle times the transformer ratio of the second operation state is at least approximately equal to the nominal duty cycle times the transformer ratio of the first operation state.

8. The switched mode power supply of claim 1, wherein the controllable switch based circuitry is any of a full bridge, half bridge, or push-pull based circuitry.

9. The switched mode power supply of claim 1, wherein:
the controllable switches comprises six switches in three legs with two switches in each of the three legs;
each of the legs is connected in parallel with the input voltage;
a point between the switches of a first one of the legs is connected to one end of the primary winding;
a point between the switches of a second one of the legs is connected to an opposite end of the primary winding; and
a point between the switches of a third one of the legs is connected to a point the primary winding separating the first winding portion and the at least one further winding portion.

10. The switched mode power supply of claim 9, wherein the controller is configured to control the controllable switches to switch between a connected state wherein the primary winding is connected to the input voltage and a disconnected state wherein the input voltage is disconnected from the primary winding.

11. The switched mode power supply of claim 10, wherein the controller is configured to control the controllable switches to switch such that the current direction through the primary winding is altered every time the primary winding is connected to the input voltage.

12. The switched mode power supply of claim 1, wherein:
the primary winding comprises a first winding portion, a second winding portion, and a third winding portion; and
the switch based circuitry comprises controllable switches capable of switching between:
a first operation state wherein the input voltage is connected only over the first winding portion;
a second operation state wherein the input voltage is connected only over the first and second winding portions; and
a third operation state wherein the input voltage is connected over the first, second, and third winding portions, thereby enabling switching between three different transformer ratios.

13. The switched mode power supply of claim 12, wherein:
the controllable switches comprises eight switches in four legs with two switches in each of the four legs;
each of the legs is connected in parallel with the input voltage;

a point between the switches of a first one of the legs is connected to one end of the primary winding;

a point between the switches of a second one of the legs is connected to an opposite end of the primary winding;

a point between the switches of a third one of the legs is connected to a point of the primary winding separating the first and second winding portions; and a point between the switches of a fourth one of the legs is connected to a point of the primary winding separating the second and third winding portions.

14. The switched mode power supply of claim 1, wherein the switched mode converter is a DC-DC converter.

15. The switched mode power supply of claim 1, wherein the switched mode converter is configured to operate with input and output voltages in the range of 10-100 V.

16. A base station, comprising:
a switched mode power supply, the switched mode power supply comprising:
  a switched mode converter configured to convert an input voltage to an output voltage; and
  a controller for controlling the switched mode converter;
wherein the switched mode converter comprises:
  on a primary side, a primary winding and a controllable switch based circuitry connecting the input voltage over the primary winding;
  on a secondary side, a secondary winding coupled to the primary winding; and
  a capacitive element connected over the secondary winding;
wherein the output voltage is obtained as the voltage over the capacitive element;
wherein the primary winding comprises a first winding portion and at least one further winding portion;
wherein the switch based circuitry comprises controllable switches capable of switching between a first operation state wherein the input voltage is connected only over the first winding portion and at least a second operation state wherein the input voltage is connected over the first and the at least one further winding portions, thereby enabling switching between two different transformer ratios; and
wherein the controller is operatively connected to the controllable switches and configured to:
  monitor the input voltage; and
  control the controllable switches to switch between the first and the at least second operation states based on the monitored input voltage, with different threshold voltages used to switch the switches from the first operation state to the second operation state and to switch back.

17. A method of operating a switched mode converter configured to convert an input voltage to an output voltage, wherein the switched mode converter comprises:
on a primary side, a primary winding and a controllable switch based circuitry connecting the input voltage over the primary winding;
on a secondary side, a secondary winding coupled to the primary winding;
a capacitive element connected over the secondary winding;
wherein the output voltage is obtained as the voltage over the capacitive element;
wherein the primary winding comprises a first winding portion and at least one further winding portion;
wherein the switch based circuitry comprises controllable switches capable of switching between a first operation state wherein the input voltage is connected only over the first winding portion and at least a second operation state wherein the input voltage is connected over the first and the at least one further winding portions, thereby enabling switching between two different transformer ratios; and
the method comprising:
  monitoring the input voltage; and
  controlling the controllable switches to switch between the first and the at least second operation states based on the monitored input voltage, with different threshold voltages used to switch the switches from the first operation state to the second operation state and to switch back.

18. The method of claim 17:
wherein the controllable switches are switched from the second operation state to the first operation state when the monitored input voltage increases above a first threshold voltage; and
wherein the controllable switches are switched from the first operation state back to the second operation state when the monitored input voltage decreases below a second threshold voltage.

19. The method of claim 17:
wherein the controllable switches, in each of the first and second operation states, are capable of switching between a connected state wherein the primary winding is connected to the input voltage and a disconnected state wherein the input voltage is disconnected from the primary winding, thereby enabling the duty cycle of the switched mode converter to be altered;
wherein, when the monitored input voltage increases above the first threshold voltage, the controllable switches are switched to alter the duty cycle from a nominal duty cycle to a lower duty cycle during a time period, while staying in the second operation state; and
wherein, at the end of the time period, the controllable switches are switched to simultaneously alter the duty cycle back to the nominal duty cycle and change the operation state from the second operation state to the first operation state.

20. The method of claim 19:
wherein, when the monitored input voltage decreases below the second threshold voltage, the controllable switches are switched to simultaneously alter the duty cycle from the nominal duty cycle to the lower duty cycle and change the operation state from the first operation state back to the second operation state; and
wherein, thereafter, the controllable switches are switched to alter the duty cycle back to the nominal duty cycle during the time period.

21. The method of claim 19, wherein the lower duty cycle times the transformer ratio of the second operation state is at least approximately equal to the nominal duty cycle times the transformer ratio of the first operation state.

* * * * *